Patented Jan. 5, 1954

2,665,287

UNITED STATES PATENT OFFICE 2,665,287

PRODUCTION OF CYCLIC ORGANOSILICON COMPOUNDS

David B. Hatcher, Evanston, Ill., assignor, by mesne assignments, to Allied Chemical & Dye Corporation, New York, N. Y., a corporation of New York No Drawing. Original application August 9, 1948, Serial No. 43,353. Divided and this application April 1, 1952, Serial No. 279,947

5 Claims. (Cl. 260—448.2)

The invention relates to the production of novel alicyclic organosilicon compounds whose molecule includes from one to two silicon atoms attached to nuclear carbon atoms.

The principal object of the invention is the production of novel alicyclic silanes whose molecule includes from one to two silicon atoms attached to nuclear carbon atoms, the silanes being obtainable in comparatively large yields from readily available and inexpensive starting materials. More specific objects and advantages are apparent from the following description, which illustrates and discloses but is not intended to limit the scope of the invention.

United States Patent No. 2,258,218 discloses the production of curable organosilicon compositions by the hydrolysis of a mixture of methyltrichlorosilane, dimethyldichlorosilane and trimethylchlorosilane. Cohydrolysis, with such a mixture of methylchlorosilanes, of a silane embodying the invention results in substantially improved hydrolysis and condensation products.

The silanes embodying the invention include those having the general formula

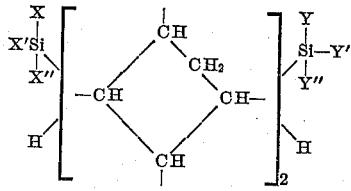

wherein each of the radicals X, X', X'', Y, Y' and Y'' is a hydrolyzable radical. The two central pentavalent radicals are joined at two points so that the radical in brackets is a radical derived from dicyclopentadiene having an overall total of four free valences. Thus, the radical in brackets in the structural formula may have any of several structures, e. g.,

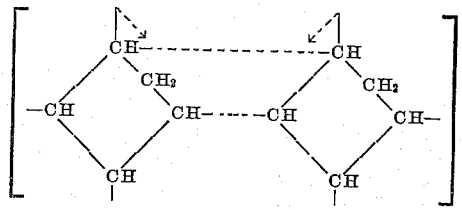

or

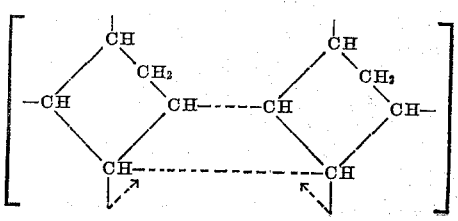

Such a silane consists of a cycloalkane in the molecule of which two hydrogen atoms have been replaced by silicon atoms, each silicon atom being attached to three hydrolyzable radicals in addition to a carbon atom in the molecule. One of the silicon atoms is attached to one nuclear carbon atom and the other is attached to a second nuclear carbon atom. Preferred silanes of the invention are those in which the hydrolyzable radicals are halo, most desirably chloro. Silanes embodying the invention include those having the general formula

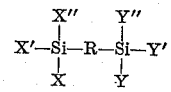

wherein R is a divalent alicyclic radical having 10 carbon atoms disposed in 3 rings, and each of the radicals X, X', X'', Y, Y' and Y'' is a hydrolyzable radical of the class consisting of halo, alkoxy, amino, aroxy and acyloxy radicals.

The free valences of the radical R are attached to different nuclear carbon atoms. R may be a divalent radical which can be considered to be derived (by the removal of two hydrogens) from octahydro-4,7-methanoindene. Such silanes, having hydrolyzable halo radicals, are produced by the reaction of the invention, which also produces trihalosilyl-hexahydro-4,7-methanoindenes.

"Hydrolyzable radical" is used herein to include halo, alkoxy, amino, aroxy and acyloxy. The halo radical is any one having an atomic weight less than 100 (i. e., fluoro, chloro or bromo). The alkoxy radical is any primary or secondary alkoxy radical having from one to four carbon atoms (i. e., methoxy, ethoxy, propoxy, isopropoxy, n-butoxy, isobutoxy or secondary butoxy). Amino is simply the —NH$_2$ group. Aroxy radicals are any in which the aryl group is phenyl, or a mono-, di- or tri-substituted phenyl radical, each substituent being a primary, secondary or tertiary alkyl radical having from one to five carbon atoms, the total number of carbon atoms in the side chains being not more than five (i. e., the aryl radical is phenyl, or ortho-, meta- or para-methyl phenyl, any di- or tri-methyl phenyl, or any substituted phenyl in which the substituents are: one ethyl; one ethyl and one methyl; two ethyls; two methyls and one ethyl; two ethyls and one methyl; either propyl radical; either propyl radical and methyl; either propyl radical and two methyls; either propyl radical and ethyl; any butyl radical; any butyl radical and methyl; or any pentyl radical). The acyloxy radical has the general formula

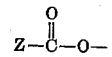

in which Z is a saturated or unsaturated straight, branched or closed chain hydrocarbon radical having from one to eighteen carbon atoms, or phenyl or substituted phenyl, the substituents, if any, consisting of from one to three alkyl radicals each having from one to five carbon atoms, and all having a total of not more than five carbon atoms, as hereinbefore described. The hydrolyzable radicals may be the same or different. The preferred hydrolyzable radical is a halo radical, the most desirable being chloro.

Silanes of the invention may be produced by means of a reaction between dicyclopentadiene and a silicohaloform, preferably silicochloroform. Dicyclopentadiene can be represented by any of several structural formulas; the formula now most generally recognized is:

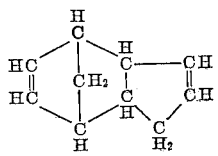

The silicohaloform can be silicofluoroform, silicochloroform or silicobromoform. Silicoiodoform is too expensive to be of commercial significance. It is believed that two reactions proceed concurrently, one of which forms bis(trihalosilyl)octahydro-4,7-methanoindenes, and the other of which forms bis(trihalosilyl)cyclopentanes. The formation of bis(trihalosilyl)octahydro - 4,7 - methanoindenes is thought to indicate that one reaction which proceeds in the practice of the invention is the addition of the silicohaloform to the double bonds of the dicyclopentadiene. The formation of bis(trihalosilyl)cyclopentanes is thought to indicate that, under the conditions at which the reaction is conducted, some of the dicyclopentadiene dissociates to form cyclopentadiene, to the double bonds of which the silicohaloform then adds.

Thus, the practice of the invention results in the production, from dicyclopentadiene and a silicohaloform, of bis(trihalosilyl)octahydro-4,7-methanoindenes and bis(trihalosilyl)cyclopentanes. In addition, the practice of the invention results in the production of material which is recovered as an intermediate distillation fraction (i. e., as a fraction having a boiling range intermediate between the boiling temperatures of the bis(trihalosilyl)octahydro - 4,7 - methanoindenes and the bis(trihalosilyl)cyclopentanes), which is thought to comprise trihalosilylhexahydro-4,7-methanoindenes. Trihalosilylcyclopentenes may also be obtained. Each of these products of the reaction of dicyclopentadiene and a silicohaloform is an addition product of one molecule of cyclopentadiene or dicyclopentadiene and from one to two molecules of a silicohaloform.

The reaction which produces silanes of the invention (i. e., between a silicohaloform and dicyclopentadiene) proceeds readily at elevated temperature and pressure. The reaction is conducted either as a batch process (i e., in a bomb) or as a continuous process (i. e., by conducting the dicyclopentadiene and the silicohaloform into a reaction zone; removing the product from the reaction zone; and separating the reactants from the silane products), the continuous process being the preferred embodiment of the invention. The silane products from the reaction are separated by fractional distillation.

When the reaction is conducted as a batch operation the silicohaloform and the dicyclopentadiene are introduced at room temperature into a steel high pressure bomb. The bomb is sealed, placed in a heating jacket, and heated at a reasonably rapid rate to reaction temperature. (Usually the heating is effected by a constant energy input so that the heating rate is rapid initially and gradually decreases until a maximum temperature is attained. A constant heating rate may be employed if desired, but close temperature control is not essential when the reaction is conducted batchwise.)

It is believed that the reaction which produces the silanes of the invention takes place slowly at temperatures as low as about 175° C. It is known that the rate of reaction increases with increases in temperature, and it is usually preferable, therefore, to conduct the reaction at a temperature materially above room temperature. Silanes of the invention are produced in substantial yields and in a reasonable time when the reaction temperature is as low as about 275° C., although it is usually preferable to conduct the reaction at a temperature of at least about 300° C. It is ordinarily advantageous that the bomb be heated at a comparatively rapid rate to the reaction temperature, a heating rate such that the temperature of the reactants is about 300° C. in from about 60 to about 90 minutes after heating is started is usually satisfactory. Somewhat faster heating rates may be practical, but the large mass of metal in the bomb ordinarily heats rather slowly. It is usually desirable that slower heating rates be avoided. It is ordinarily advisable not to heat the bomb above about 400° C., and preferable not to heat the bomb above about 375° C. Apparently, higher temperatures do not affect the products or the yield to a substantial extent, but the expenditure of extra energy required to conduct the reaction at a higher temperature is not warranted. For the same reason, it is usually most desirable that the reaction be conducted at a temperature not higher than about 350° C.

Because the reactants are gases at the reaction temperatures, it is usually desirable to conduct the reaction at superatmospheric pressure so that reasonable amounts of silanes of the invention can be prepared without the use of unduly large equipment. It has been found to be practical to conduct the reaction at a pressure as low as about 300 pounds per square inch gauge, but it is usually preferable to use a pressure of at least about 500 pounds per square inch gauge. Most desirably, the reaction is conducted at a pressure of at least about 700 pounds per square inch gauge. In some instances it may be desirable to conduct the reaction at a pressure as high as about 1500 pounds per square inch gauge, although it is usually preferable to use a pressure not higher than about 1200 pounds per square inch gauge. Most desirably the reaction is conducted at a pressure not greater than about 900 pounds per square inch gauge.

It is desirable in all instances to avoid the introduction of air, containing moisture, which hydrolyzes the silanes in the reactor to produce a hydrohalic acid.

It is believed that one reaction that occurs is between two molecules of the silicohaloform and one molecule of the alicyclic diene (i. e., that the ratio of the reactants participating in the reaction is two mols of the silicohaloform per mol of the dicyclopentadiene). The reaction which is believed to occur is represented in Equation 1, below (1) 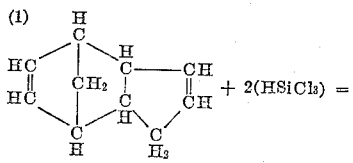 + 2(HSiCl₃) =

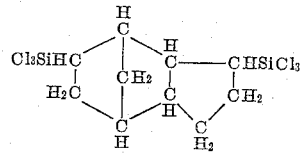

which shows the reaction of two molecules of silicochloroform with one molecule of dicyclopentadiene (i. e., 3a, 4, 7, 7a-tetrahydro-4,7-methanoindene) to produce one molecule of 1,6-bis-(trichlorosilyl) octahydro - 4,7 - methanoindene. It is known that the reaction produces bis(trichlorosilyl) octahydro-4,7-methanoindenes, and it is believed that a mixture is produced which includes the 1,6-bis(trichlorosilyl) octahydro-4,7-methanoindene shown, as well as the 1,5-, the 2,6- and the 2,5-compounds.

In some instances it may be desirable to use slightly less than the theoretical proportions of the silicohaloform with the dicyclopentadiene, but it is usually desirable to use at least about 1 mol of the silicohaloform per mol of the dicyclopentadiene and preferable to use at least about 2 mols per mol of the dicyclopentadiene. As has been stated herein, the production of some bis(trichlorosilyl) cyclopentane indicates that the dicyclopentadiene exists, in part, as cyclopentadiene under the conditions of the reaction; the theoretical amount of the silicohaloform required depends upon the amount of the cyclopentadiene present in the reactor, and is not determined solely on the basis of the dicyclopentadiene charged. It is ordinarily most desirable to use at least about 4 mols of the silicohaloform per mol of the dicyclopentadiene. Usually it is desirable to use not more than about 8 mols of the silicohaloform per mol of the dicyclopentadiene, although much higher ratios can be used. Ordinarily, it is most desirable to use not more than about 5 mols of the silicohaloform per mol of the dicyclopentadiene.

When a continuous reaction is used to produce silanes of the invention, the temperature of the reaction zone should be controlled so that reaction occurs to the desired extent in the time during which the reactants are present in the reaction zone. Thus the temperature of the reaction zone and the contact time that is used are, in general, interdependent; with a shorter contact time the reaction temperature should be higher. The same considerations that govern the operating temperature ranges when the reaction is conducted batch-wise govern the temperature ranges when the reaction is run continuously.

It is usually desirable to preheat the reactants so that they are introduced into the reaction zone at approximately the reaction temperature. By this procedure the material entering the reaction zone is already at reaction temperature, and it is only necessary to maintain that temperature. In this way the reaction zone is kept to a minimum size.

As noted above, the contact time that is used depends upon the operating temperature. Usually, it is desirable to use contact times not shorter than about 10 minutes, and preferably to use contact times not shorter than about 15 minutes. Ordinarily, it is most desirable to use contact times not shorter than about 20 minutes. Usually, it is desirable to use contact times not longer than about 100 minutes, and preferably to use contact times not longer than about 90 minutes. Most desirably, contact times not longer than about 80 minutes are used.

The same considerations that govern the proportions of reactants and the pressure used when the reaction is conducted as a batch operation govern the proportions of reactants and the pressure used when the reaction is conducted as a continuous operation.

Such reaction produces only cycloaliphatic compounds with trihalosilyl substituents; these materials can be subjected to further reactions to produce cycloaliphatic compounds with silyl substituents other than trihalosilyl. Thus, alicyclic compounds with silyl substituents having, attached to the silicon atoms, one or more amino radicals are produced by reaction between ammonia and a bis(trihalosilyl)cyclopentane, a trihalosilylcyclopentene, a trihalosilylhexahydro-4,7-methanoindene or a bis(trihalosilyl) octahydro-4,7-methanoindene.

Cycloaliphatic compounds with silyl substituents having, attached to the silicon atoms, alkoxy radicals are produced by reaction between the bis(trihalosilyl)cyclopentane, trihalosilylcyclopentene, trihalosilylhexahydro-4,7-methanoindene or bis(trihalosilyl) octahydro-4,7-methanoindene and alcohols having the general formula S—OH in which S is methyl, ethyl, propyl, isopropyl, n-butyl, isobutyl or secondary butyl. Alkoxy is substituted for halo by means of such a reaction, with corresponding formation of a hydrogen halide.

Cycloaliphatic compounds with silyl substituents having, attached to the silicon atoms, hydrolyzable acyloxy groups are produced by reaction between an acid anhydride and the silanes having hydrolyzable radicals which consist of alkoxy groups, or, in some instances, by reaction between the bis(trihalosilyl)cyclopentane, trihalosilylcyclopentene, trihalosilylhexahydro-4,7-methanoindene or bis(trihalosilyl) octahydro-4,7-methanoindene and the sodium salt of the organic acid.

Alicyclic compounds with silyl substituents having hydrolyzable aroxy radicals attached to the silicon atoms are prepared by reaction between the bis(trihalosilyl)cyclopentane, trihalosilylcyclopentene, trihalosilylhexahydro - 4 , 7 - methanoindene or bis(trihalosilyl) octahydro-4,7-methanoindene and phenol or monoalkyl-, dialkyl- or trialkyl-substituted phenols in which each alkyl substituent has from one to five carbon atoms, and all the alkyl substituents contain a total of not more than five carbon atoms, as hereinbefore described.

*Example*

Dicyclopentadiene is reacted with a silicohaloform according to the following procedure:

Silicochloroform (271 grams) and dicyclopentadiene (132 grams) are charged into a steel high pressure bomb having a capacity of about 1100 ml. and the bomb is sealed, placed in a heating jacket, and heated, using a constant energy input sufficient to achieve a temperature of about 290° C. (when the pressure is about 435 pounds per square inch gauge) approximately 70 minutes after heating is started, and a temperature of about 344° C. approximately 90 minutes after heating is started. The temperature inside the bomb is maintained between about 310° C. and about 340° C. for an additional 120 minutes, after which time heating is discontinued; the bomb is allowed to cool; and the product (which is believed to contain trichlorosilylcyclopentenes, the -2 and the -3 compounds) is removed from the bomb and separated by fractional distillation through a jacketed column 36 inches in length and 25 mm. in diameter, packed with glass helices. Mixtures of bis(trichlorosilyl)-cyclopentanes (52 grams believed to be a mixture of the 1,2- and the 1,3- compounds; boiling range from 169° C. to 175° C. at an absolute pressure equal to about 55 mm. of mercury), bis(trichlorosilyl)octahydro-4,7-methanoindenes (55 grams believed to be a mixture of the 1,5-, the 1,6-, the 2,5- and the 2,6- compounds; boiling range from 260° C. to 295° C. at an absolute pressure equal to about 4 mm. of mercury) and an intermediate cut (33 grams believed to be a mixture of trichlorosilylhexahydro-4,7-methanoindenes, i. e., the 1- trichlorosilyl-, 2-trichlorosilyl-, and 5-trichlorosilylhexahydro-4,7-methanoindenes; boiling range from 178° C. to 206° C. at an absolute pressure equal to about 4 mm. of mercury) are recovered from the reaction products.

Results substantially the same as those described above may be obtained by carrying out a reaction between dicyclopentadiene and silicofluoroform or silicobromoform, or a mixture of silicohaloforms.

This is a division of application Serial No. 43,353, filed August 9, 1948, and now abandoned.

Having described the invention, I claim:

1. An organosilicon compound having the general formula

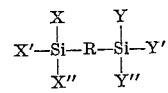

wherein each of the radicals X, X', X'', Y, Y' and Y'' is a radical of the class consisting of halo, alkoxy, amino, aroxy and acyloxy radicals and —R— is a divalent radical derived from octahydro-4,7-methanoindene by removal of two hydrogen atoms from positions of the class consisting of the 1,6; 1,5; 2,6 and 2,5 positions.

2. A bis(trihalosilyl)octahydro-4,7-methanoindene of the class consisting of the 1,6; 1,5; 2,6 and 2,5 isomers.

3. A bis(trichlorosilyl)octahydro-4,7-methanoindene of the class consisting of the 1,6; 1,5; 2,6 and 2,5 isomers.

4. A method of producing an organosilicon compound which comprises reacting dicyclopentadiene with a silicohaloform at a temperature of at least 175 degrees C. and a pressure of at least 300 pounds per square inch.

5. A method as claimed in claim 4 in which the silicohaloform is silicochloroform.

DAVID B. HATCHER.

References Cited in the file of this patent

UNITED STATES PATENTS

| Number | Name | Date |
|---|---|---|
| 2,524,529 | Krieble | Oct. 3, 1950 |